UNITED STATES PATENT OFFICE.

LEO E. BOWKER, OF KEENE, NEW HAMPSHIRE.

COATING THE INSIDE OF VESSELS FOR HOLDING OILS.

SPECIFICATION forming part of Letters Patent No. 343,622, dated June 15, 1886.

Application filed March 9, 1886. Serial No. 194,647. (No specimens.)

*To all whom it may concern:*

Be it known that I, LEO E. BOWKER, a citizen of the United States, residing at Keene, in the county of Cheshire and State of New Hampshire, have invented certain new and useful Improvements in Compositions for Coating the Inside of Vessels for Holding Oils, of which the following is a specification.

The object of my invention is to produce a composition to be applied to wooden or metallic vessels or packages used for storing or transporting oils, paints, varnish, japan, spirits of turpentine, benzine, and other substances of like nature, so as to render them proof against the action or penetration of said substances.

My composition consists of the following ingredients, combined in the proportions stated— viz., pure water, five quarts; pulverized borax, one pound; gum-shellac, two pounds; glycerine, one-half pound; hard glue, four pounds. These ingredients are mixed or united to form my composition in the manner hereinafter set forth, and great care is necessary in its preparation in order to produce the desired results.

The formula for mingling or combining said ingredients which, after many experiments and trials, I have found to be the best, is as follows—viz: First, to one gallon of boiling water I add three-fourths of a pound of pulverized borax, which is immediately dissolved in the water. Then I add to this solution of borax two pounds of gum-shellac and boil the whole together at a temperature of 200° Fahrenheit for about one hour or until the compound is thoroughly mixed; second, I then take one quart of boiling water and add one-fourth pound of pulverized borax, and as soon as dissolved I add one-half pound of glycerine and mix the whole together; third, the first and second compounds above described are now put together and thoroughly mixed by agitation while hot. I then add to this last compound four pounds of the best quality of hard glue, and boil or simmer the whole together at a temperature of about 200° Fahrenheit from two to three hours, when the whole mass is united, and forms a translucent compound resembling ordinary copal-varnish. It is then ready for use, and is applied to the inside of the vessel or package with a brush while the composition is still hot. It soon dries, and the thickness of the coating is increased, as desired, by applying two or more coats after the previous coating has sufficiently hardened.

This composition presents a smooth varnish-like surface, and is entirely impervious to the action or penetration of oily or greasy substances. After it has thoroughly dried on the inside of a vessel or package it possesses the property of being very elastic, and resembling india-rubber in its texture. This renders it valuable for application to wooden cans or packages made from staves, which are often exposed for a long time in very dry places while empty. This causes the joints to open, and if the coating is of a brittle nature it will crack and render the package leaky. The elastic quality of my composition precludes the possibility of such occurrence. I find also that it is less affected by moisture than other compositions employed for coating oil-packages, and the borax and shellac contained therein act as a preservative to the glue, so that it will withstand the effects of long continued moisture as well as exposure in dry places.

Having fully described my invention, what I desire to secure by Letters Patent is—

1. The composition of matter hereinabove described to be used for rendering wooden or metallic packages proof against the action or penetration of oils, paints, varnish, japan, spirits of turpentine, and benzine, consisting of water, pulverized borax, gum-shellac, glycerine, and hard glue, in the proportions specified.

2. The process of rendering a wooden or metallic package impervious to the action of oils, paints, varnish, japan, spirits of turpentine, and benzine, which consists in applying to the inside of said package a lining or coating composed of water, pulverized borax, gum-shellac, glycerine, and hard glue, prepared in the proportions and in the manner herein set forth.

3. A vessel or package made of wood or metal, having a coating on the inside thereof composed of water, pulverized borax, gum-shellac, glycerine, and hard glue, prepared in the proportions and as herein set forth, for the purpose of rendering said vessel or package proof against the action or penetration of paints, varnish, japan, spirits of turpentine, benzine, and other substances of a like nature.

In testimony whereof I affix my signature in presence of two witnesses.

LEO E. BOWKER.

Witnesses:
HIRAM BLAKE,
ADOLPH PRESSLER.